Feb. 8, 1966          G. EVANS          3,233,922
PIPE JOINT
Original Filed May 16, 1960

INVENTOR
GORDON EVANS

BY: Raphael Semmes
ATTORNEYS

United States Patent Office 3,233,922
Patented Feb. 8, 1966

3,233,922
PIPE JOINT
Gordon Evans, St. Catharines, Ontario, Canada, assignor, by mesne assignments, to Cast Iron Soil Pipe Institute, a general non-profit corporation of Illinois
Continuation of application Ser. No. 29,383, May 16, 1960. This application July 29, 1963, Ser. No. 298,198
1 Claim. (Cl. 285—236)

This application is a continuation of my copending application Serial No. 29,383, filed May 16, 1960, now abandoned.

This invention relates to pipe joints, and consists more particularly in new and useful improvements in a joint primarily designed for connecting aligned sections of cast iron pipe having identical ends. In other words, the joint of the present invention is not intended for pipe sections having complementary bells and spigots. It may be noted that while the joint is here described as used in connection with cast iron pipe, its construction and principle of operation may also be applied to joints for use with other types of pipe, including those formed of rigid plastic material.

In conventional sewer installations, domestic plumbing and the like, lengths of cast iron pipe are joined together with bell and spigot joints, and the joint is sealed by packing oakum in the hub or bell around the spigot, pouring lead over the oakum, and hand caulking until the joint is pressure-tight. In addition to being an expensive procedure, this conventional system is slow and has certain limitations of application, as well as presenting a fire hazard. The bell and spigot joint is also expensive in terms of the amount of cast iron required to extend a run of pipe over any prescribed distance. For example, when laying a straight run of 3″ pipe over a distance of 20 feet with standard 5 foot lengths, five joints are required, and since there is an overlap of approximately 2¼″ at each joint, a total of 11¼″ of extra pipe length is required.

Furthermore, in order to provide sufficient strength to the bell portions of the joints, it is necessary to form the bells with a wall thickness greater than the wall thickness of the remainder of the pipe. The amount of extra cast iron required when the bell and spigot joint is used, is even more striking when one considers fittings such as elbows and Y fittings. For example, a 45° Y fitting has two bells at one end, and the other, or spigot end, must be long enough to allow a workman to get at the hub thereof to perform the caulking operation.

It is an object of the present invention to provide a joint for sections of cast iron pipe wherein caulking is eliminated, as the joint is designed to accommodate pipe sections having substantially identical ends arranged in alignment. Thus, by eliminating the necessity of the bell and spigot, there is a resultant reduction in the weight of the fitting. By the use of the present invention, the elimination of the bells and the shortening of the spigot end reduces the weight of a 3″ Y fitting from 13 pounds to 6 pounds. This reduction in weight is important, not only from the viewpoint of economy, but also from the viewpoint of the workman who is required to lift and carry the pipe and fittings over prolonged periods of time.

In addition to presenting a fire hazard due to the use of molten lead when bell and spigot type joints are installed in buildings, these conventional joints have a further disadvantage in that the width of the bell very often prevents the installation of the pipe in places which would otherwise accommodate the pipe itself. For example, the standard size of pipe for house installation is 3″ in inside diameter, having an outside diameter in the region of 3 and ⅜″. However, the average outside diameter of the bell for standard 3″ is approximately 5″. Thus, the pipe cannot be installed in a standard 2″ x 4″ stud wall, since the outer diameter of the bell exceeds the wall thickness.

It is therefore another object of the present invention to overcome these disadvantages and to provide a joint which may be assembled in standard 3 and ¾″ stud walls.

A further object of the invention is to provide a joint for cast iron pipes arranged in abutting relation or aligned longitudinally in end-to-end relation, including a joining unit which may be applied around the adjacent pipe ends to effect a pressure tight seal without appreciably increasing the outer diameter thereof, whereby the pipe may be installed in places where the presently used pipe cannot, due to the large size of the bell and spigot joint.

A still further object of the invention is to provide a joint which requires a minimum of time and no special tools for installation, yet providing a more flexible joint than that presently employed so as to allow the piping system to flex with the buiding when it settles.

A still further object of the invention is to provide a joint which insures proper alignment of pipes so that internal obstructions are eliminated and allows alterations and repairs without the destruction that is caused when repairing a plumbing system of the type employing bell and spigot joints. The joint of the present invention is also more suitable for underfloor installation and is easier to install in horizontal position than is the conventional bell and spigot joint.

Referring to the drawings in which numerals of like character designate similar parts throughout the several views.

Figure 2:
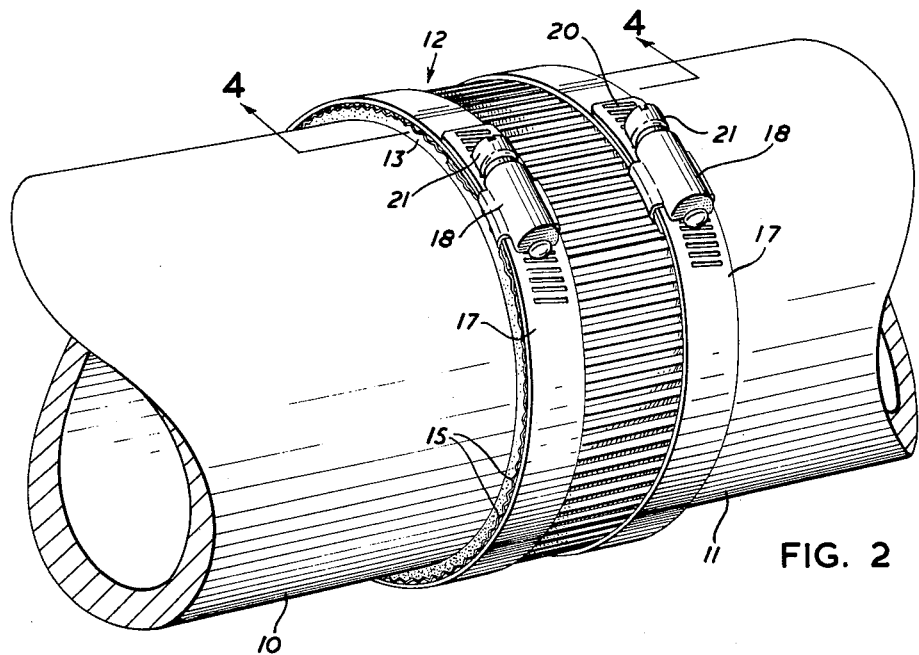
FIG. 2 is a perspective view of an assembled pipe joint embodying the invention.
Figure 4:
FIG. 4 is a sectional view taken on line 4—4 of FIG. 2, showing the relationship of the elements forming in joint.

As seen in FIG. 2, the pipe joint of the present invention is applied to two sections of cast iron pipe 10 and 11, arranged in end-to-end alignment, and includes a clamping band 12 which overlaps and surrounds the adjacent ends of the pipe sections. As best seen in FIG. 4, an annular, resilient packing member 13 is interposed between the band 12 and the pipe ends and bridges the latter, said packing member being of a width substantially the same as that of the clamping band 12 and provided on its inner surface with a centrally disposed, annular raised ridge 14 which fits between the aligned pipe ends to prevent actual contact therebetween. Thus, the clamping band 12 has the dual function of holding the pipe ends together to effect a joint, and of compressing packing member 13 tightly around both pipe ends to seal the joint.

Figure 1:
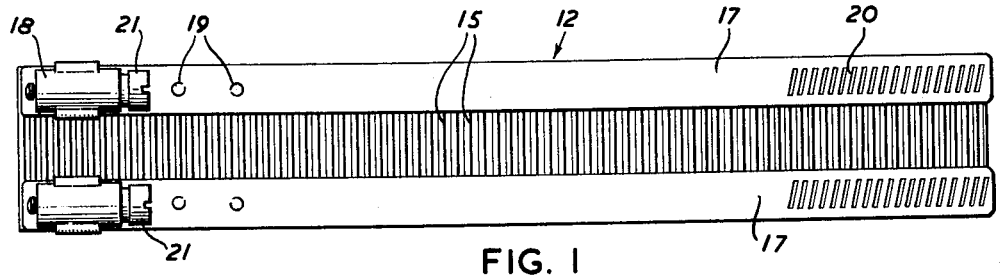
FIG. 1 is a plan view of a clamping band and associated compressing straps of the invention.

The clamping band 12 is preferably made of high quality stainless steel to provide the strength and corrosion resistance required, and, as seen in FIGS. 1 and 2, is provided with a series of transversely extending corrugations 15 throughout its entire length. The corrugations 15 not only serve to strengthen the band so as to prevent undue flexing of the assembled joint, but also facilitate the successful joining of two pipe lengths of slightly different diameters. In this connection, it may be noted that during the manufacture of cast iron pipe, inaccuracies sometimes occur both in the pipe diameter and in the shape of the pipe, with the result that the diameter might vary as much as 1/16 of an inch from the standard size, or the pipe might be somewhat oval in cross-section. In the bell and spigot-type joint, the space between the outside of the spigot end and the inside of the overlayping bell is sufficient to accommodate most of these variances. However, when the bell and spigot system is eliminated as in the present invention, these variances must be otherwise accommodated, and the corrugated clamping band of the present invention is particularly suited for this purpose.

As previously stated, the corrugations 15 run transversely of the clamping band 12 so that when the band is applied to the adjacent ends of two pipe sections as in FIG. 2, the corrugations run longitudinally of the pipe, and if the pipe sections are of slightly different diameters, the area of the clamping band surrounding the larger pipe section will expand due to the flattening of the corrugations in that area. This expansion permits tightening of the clamping band about both pipe ends to the same degree with little or no danger of causing the band to buckle, which would otherwise occur with a completely flat band.

In the manufacture of pipe to be joined in accordance with this invention, it is preferable to form flanges 23 on the pipe ends, as shown in FIG. 4, to facilitate the resistance of the joint against forces tending to pull the pipe ends apart. In other words, these flanges 23 are engaged by the packing member as it is compressed so as to provide a firm gripping action. It may be pointed out that these flanges are not absolutely necessary and that a very strong joint can be obtained between two plain pipe ends or between a plain pipe end and a flanged pipe end. This latter arrangement will occur when an off-standard length of pipe is required for a custom fit, making it necessary to cut a standard length of pipe which, of course, would not have a flange.

The clamping band 12 is tightened about the adjacent pipe ends by the use of two tightening straps 17 adapted to encircle the band adjacent each of its longitudinal edges to seal the joint by compressing the packing member 13 about the respective pipe ends. An effective means for tightening the straps 17 about the bands 12 may comprise screw-type tightening units 18 which are affixed to one of each strap and are adapted to receive the opposite ends of respective straps which are provided with a series of inclined slots 20. The tightening units 18 include screws 21 which are rotatably supported in the units and spaced upwardly a slight distance from the respective straps. Thus, the slotted ends of the respective straps are received by the units 18 in overlapping relation to the opposite ends of the straps for engagement of the inclined slots 20 by the threads of screws 21. Preferably, the straps 17 are fixed to the band 12 at points remote from their slotted ends, as by welding or the like at 19, to maintain the proper positioning of the straps with respect to the band and to facilitate the handling of the assembly during installation. It is important, however, that a certain area of each strap adjacent its slotted end be free of connection to the band 12 to permit independent tightening of the respective straps without buckling the band 12. It is also important that the actual pulling effect in tightening the joint is accomplished solely by tightening the straps around the band 12 to compress the latter and not by a pulling of the band itself, which, of course, would cause a longitudinal tension with the resultant stretching out of the corrugations 15. Naturally, any tension which would pull out or flatten the corrugations would reduce the effectiveness of the clamping band both from the standpoint of reinforcement and its ability to accommodate pipe ends of slightly different diameters, as previously described. Thus, as seen in FIG. 2, as the screws 21 are turned, the slotted ends of the straps 17 are drawn through the units 18 and are thus tightened about the opposite edges of the band 12 with no longitudinal tension on the band itself.

Figure 3:
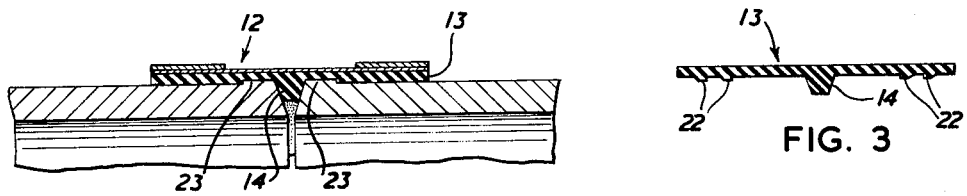
FIG. 3 is a cross-sectional view of a packing member used in the present invention.

As shown in FIG. 3, the packing member 13 consists of an annular band of rot-resistant rubber, preferably synthetic rubber having the annular ridge 14 extending centrally around its inner surface, as previously described, and one or more annular sealing rings 22 also on the inner surface and spaced inwardly from the edges of the packing member. In addition to preventing actual contact between the pipe ends to avoid their damaging each other as the joint is made up, the ridge 14 also insures the the pipe ends will meet squarely and that the packing member will be located in the center of the joint. Furthermore, the ridge 14 presents a greater thickness of rubber in that area most likely to be reached by liquids and gases passing through the pipe which, of course, adds to the maintenance of a tight seal over long periods of time.

Syntheic rubber appears to be the most suitable material for the packing member 13 since it has been found to be most resistant to the corrosion effect of the material normally found in sewage and drainage systems. However, should some material which might affect the deterioration of synthetic rubber enter the sewage system, the failure of the packing member 13 would, in most cases, be delayed indefinitely due to the increased thickness of the packing member 13 by the provision of the ridge 14.

Sealing rings 22 are formed integrally with and around the inside of packing member 13 to increase the pressure with which the packing member grips the pipe ends as clamping band 12 is tightened. The size and number of sealing rings can be varied in accordance with the requirements to be met to effect a suitable seal as the smoothness of the pipe exterior varies. Where the pipe surface is particularly rough, larger sealing rings will be required. As an alternative to forming sealing rings integrally with the packing member 13, clamping band 12 could be provided with similarly shaped annular indentations, the under surfaces of which protrude and engage the packing member 13 to effect positive line contact at selected points around the pipe ends.

Tightening units 18 may be provided with screws 21 of the "one-way" variety having the slotted heads so shaped that only tightening of the screws can be effected. This alternative is advantageous where the assembled joint is to be installed in an open location. Where the joint is likely to be tampered with, such as by children, it is more important to provide some means whereby the joint cannot be loosened. When it is desired to dismantle this type of joint, the operation could be performed by a properly equipped workman by cutting straps 17 with a cold chisel or hacksaw.

As previously mentioned, the joint of the present invention provides more flexibility than the bell and spigot type joint and this compensates for the settling of newly constructed buildings having a piping system incorporating the new joint. However, complete flexibility is not required, and, in most instances, would be undesirable. Accordingly, the joint of this invention has a certain amount of rigidity so as to withstand excessive transverse forces without buckling. This rigidity is supplied by the corrugations 15 which cooperate to give the band 12 a structural strength sufficient to resist forces which might cause the joint to bend past desirable limits. This joint is capable of flexing through small angles which might have to be accommodated as a building settles, but will strongly resist any tendency to bend further.

Also, by providing the corrugations 15, a very versatile joint is produced. It is the manner in which these corrugations flex to accommodate variances in pipe size and surface contour which provides one of the most important advantages of the present invention. This joint will work successfully on pipe which varies in size, shape and surface finish due to inaccuracies of manufacture and on or between flanged or plain end pipe.

From the foregoing, it is believed that the invention may be readily understood by those skilled in the art without further description, it being borne in mind that numerous changes may be made in the details disclosed without departing from the spirit of the invention as set forth in the following claim.

I claim:

A pipe joint for joining two pipe sections in end to end alignment, comprising a clamping band of semi-stiff, flexible sheet material adapted to surround the adjacent ends of pipe sections to be joined, with the opposite longitudinal extremities of said band in overlapping relation, said band being provided with transversely extending corrugations throughout its length which, when said band is applied to the end of said pipe sections, extend longitudinally with respect to the latter, a resilient, annular packing member interposed between said clamping band and pipe ends, and bridging the junction of said pipe ends, compressing straps encircling said clamping band adjacent its respective longitudinal edges, separate strap tightening units fixed to one end of each strap, independent of direct connection to said clamping band for receiving the opposite ends of respective straps in overlapping relation, each of said straps being connected to said clamping band at one region only, said region being adjacent said tightening units at points remote from said opposite ends, and means in each tightening unit for engaging said opposite ends of said strap and drawing the same through respective tightening units to thereby permit the independent compression of opposite longitudinal edges of said corrugated band and the underlying packing member around respective pipe sections to compensate for variations in the diameters or surface contours of two joined pipe sections.

References Cited by the Examiner
UNITED STATES PATENTS

| | | | |
|---|---|---|---|
| 131,843 | 10/1872 | Brooks | 85—45 |
| 607,018 | 7/1898 | Connelly | 285—45 X |
| 1,833,776 | 11/1931 | Dillon | 285—365 X |
| 2,890,899 | 6/1959 | Simmons et al. | 285—371 X |
| 2,958,549 | 11/1960 | Spafford | 285—420 X |

FOREIGN PATENTS

| | | |
|---|---|---|
| 1,011,740 | 4/1952 | France. |
| 580,186 | 7/1945 | Great Britain. |
| 513,235 | 2/1955 | Italy. |

CARL W. TOMLIN, *Primary Examiner.*